United States Patent [19]

Lee

[11] Patent Number: 5,575,041
[45] Date of Patent: Nov. 19, 1996

[54] RESILIENTLY YIELDABLE TAIL STOCK DEVICE FOR USE IN A NUMERICALLY CONTROLLED LATHE

[75] Inventor: Juong W. Lee, Masan, Rep. of Korea

[73] Assignee: Daewoo Heavy Industries, Ltd., Incheon, Rep. of Korea

[21] Appl. No.: 322,127

[22] Filed: Oct. 13, 1994

[30] Foreign Application Priority Data

Oct. 13, 1993 [KR] Rep. of Korea ............... 93-20959

[51] Int. Cl.$^6$ ................................................ B23B 23/00
[52] U.S. Cl. ......................................... 82/148; 82/153
[58] Field of Search .............................. 82/148, 150, 151, 82/153

[56] References Cited

U.S. PATENT DOCUMENTS 1,791,392  2/1931  Trefethen ................................. 82/148
4,335,633  6/1982  Boffelli .................................... 82/148

FOREIGN PATENT DOCUMENTS 92-11390  7/1992  Rep. of Korea .
93-4559   3/1993  Rep. of Korea .

Primary Examiner—M. Rachuba
Assistant Examiner—Kenneth J. Hansen
Attorney, Agent, or Firm—Lowe, Price, LeBlanc & Becker

[57] ABSTRACT

A resiliently yieldable tail stock device for use in a numerically controlled lathe comprises a body slidable along a bed toward and away from a spindle, the slidable body having a bore and a passage hole each formed therethrough in an axial alignment with the spindle. Removably received within the bore of the slidable body is a center socket movable between an extended position and a retracted position and having a tapering blind bore open at its front end. The center socket carries a live center that has a pointed front end engageable with a workpiece and a tapering rear shank fitted into the tapering bore. Fixedly secured to the center socket is an elongate rod carrying a dog at its distal end. A compression spring is used to resiliently bias the center socket toward the extended position. A combination of electric motor and lead screw serves to cause a linear reciprocating movement of the slidable body. The electric motor is deenergized as the dog reaches a rearmost position just above a proximity switch.

10 Claims, 2 Drawing Sheets

RESILIENTLY YIELDABLE TAIL STOCK DEVICE FOR USE IN A NUMERICALLY CONTROLLED LATHE

FIELD OF THE INVENTION

The present invention pertains generally to a tail stock for use in a numerically controlled automatic lathe, and more specifically to a resiliently yieldable tail stock device which is adapted to rotatably clamp a workpiece of elongated configuration with a controlled thrust force, thus avoiding any deformation of the workpiece which would otherwise occur in the clamping process.

DESCRIPTION OF THE PRIOR ART

As is well-known in the art, the numerically controlled lathe includes, among other things, a tail stock movable toward and away from a spindle to thereby clamp or unclamp the free end of a workpiece. Typically, the tail stock is slidably mounted on a bed so that it can be subjected to a sliding movement by means of, e.g., an electric motor operatively coupled to the tail stock via a lead screw.

Due to the difficulty encountered in positioning the tail stock exactly, the prior art lathe normally employs a hydrostatic or pneumatic actuator which has the ability to accommodate undue rotary movement of the electric motor and, at the same time, to depress the tail stock against the workpiece at the final stage of the workpiece clamping process.

Korean Utility Model Laid-open Publication No. 92-11390 filed on Dec. 28, 1990 in the name of the assignee of the present invention discloses an automated tail stock device of the type comprising a body slidably-mounted on a lathe bed, a live center carried by the body for rotatably clamping a workpiece at its pointed end, an electric motor fixedly attached to the bed to produce rotary drive force, a lead screw for converting the rotary drive force of the motor into a reciprocating movement of the body and a hydraulic actuator adapted to accommodate undue rotary movement of the motor and to apply a biasing force to the body so that the live center can be depressed against the workpiece.

The tail stock device noted just above appears to present no problem in rotatably supporting a rigid workpiece which is less susceptible of deformation. However, the tail stock device is disadvantageous in tin at a workpiece of reduced thickness, e.g., pipe or sleeve, may experience deformation by the combined action of the rotary force of the electric motor and the depression force of the hydrostatic actuator. Another disadvantage of the afore-mentioned prior art tail stock device is that it has to be equipped with a costly and structurally complicated hydrostatic actuator in order to accommodate undue rotary movement of the electric motor.

Korean Utility Model Laid-open Publication No. 93-4559 filed on Aug. 20, 1991 in the name of Mando Machinery Co., Ltd teaches a two speed tail stock device for use in a numerically controlled lathe, comprising a fixed cylinder, a center-carrying piston slidably fitted into the cylinder for movement between an extended position and a retracted position and a plurality of control valves for changing flow path and pressure of a working fluid to have the center-carrying piston advance and retract at a first or a second speed.

Although the two speed tail stock device is capable of displacing a live center toward and away from a workpiece at variable speeds, it cannot preclude the possibility of workpiece deformation which would occur due to the failure to absorb an exceedingly large biasing force applied to the workpiece. Moreover, the use of multiple control valves tends to make the two speed tail stock device costly and to increase the maintenance need thereof.

SUMMARY OF THE INVENTION

Accordingly, it is an object of the invention to provide a resiliently yieldable tail stock device for a numerically controlled lathe that makes it possible to rotatably support a workpiece of low rigidity with no fear of unwanted deformation and further that can eliminate the need for a costly and structurally complicated hydrostatic actuator.

With this object in view, the present invention provides a tail stock device for use in a numerically controlled lathe having a bed and a spindle rotatable with a workpiece, which comprises: a body slidable along the bed toward and away from the spindle, the slidable body having a bore and a passage hole formed through the body in an end-to-end relationship with each other; a center socket received within the bore of the slidable body for movement between an extended position and a retracted position, the center socket having a tapering blind bore open at its front end; a live center having a pointed front end engageable with the workpiece and a tapering rear shank removably fitted into the tapering blind bore of the center socket; an elongate rod fixedly secured to the center socket at its proximal end and carrying a dog at its distal end, the elongate rod passing through the passage hole of the slidable body; a compression spring retained in the bore of the slidable body for resiliently biasing the center socket and the elongate rod toward the extended position; a proximity switch operable by the dog to generate a stop signal as the center socket and the elongate rod come into the retracted position; and a drive mechanism for causing the slidable body to move back and forth and for inhibiting further backward movement of the slidable body in response to the stop signal.

BRIEF DESCRIPTION OF THE DRAWINGS

Other objects and advantages of the invention will become apparent from the following description of the preferred embodiment taken in conjunction with the drawings in which.

DETAILED DESCRIPTION OF THE PREFERRED EMBODIMENT

Figure 1:
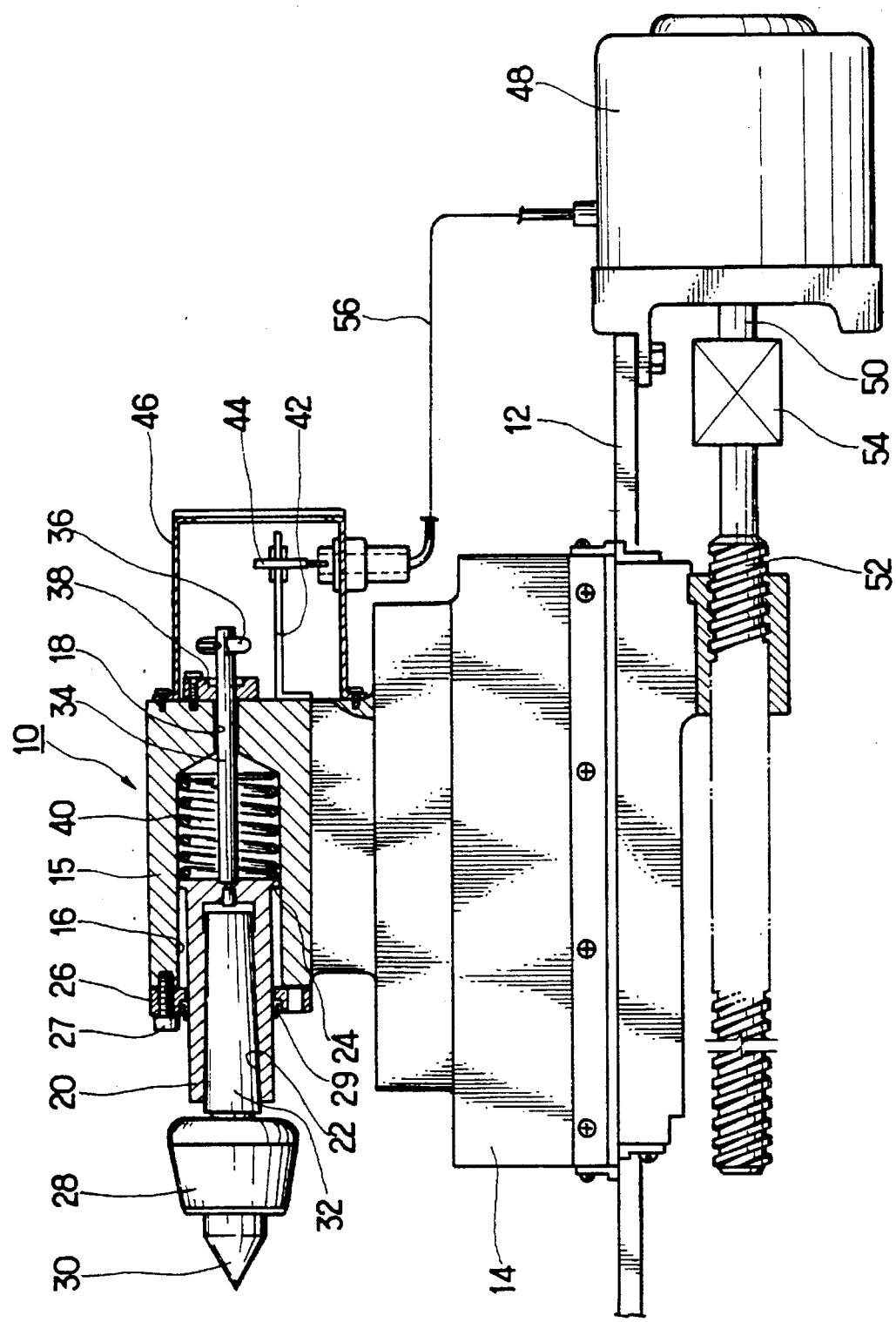
FIG. 1 is an elevational view of the resiliently yieldable tail stock device in accordance with the present invention, with portions thereof removed for clarity.
Figure 1:

Referring now to FIG. 1, there is shown a tail stock device 10 for use in a numerically controlled lathe, which embodies the instant invention in a preferred form. Key role of the tail stock device 10 is to rotatably support the free end of a rotating workpiece W to thereby prevent any sagging thereof in a cutting process. To do this, the tail stock device 10 is designed to move along a lathe bed 12 toward and away from a spindle of a head stock(not shown) which is firmly gripping the workpiece W for rotation therewith as a unit. As used herein, the term "front" or "forward" is intended to mean a direction facing toward or approaching to the workpiece, with the term "rear" or "backward" having the opposite meaning.

The tail stock device 10 is provided with a body 14 slidably mounted on the bed 12 for linear reciprocating movement toward and away from the workpiece W. The slidable body 14 has a straight bore 16 of relatively large diameter and a passage hole 18 of small diameter each formed through a head portion 15 of the slidable body 14 in an end-to-end relationship with respect to one another. It should be recognized that the axis of the bore 16 has to coincide with the axis of the spindle to ensure an increased cutting accuracy.

Removably received within the bore 16 of the slidable body 14 is a center socket 20 that can be caused to move between an extended position and a retracted position. The center socket 20 has a tapering blind bore 22 open at its front end and a stop edge 24 circumferentially extending in the vicinity of its closed end. It is preferred that a retainer plate 26 of annulus shape be secured to the head portion 15 of the slidable body 14 by means of a set screw 27. A front dust seal 29 may desirably be provided on the inner circumference of the retainer plate 26 to inhibit any infiltration of alien materials into the straight bore 16 of the slidable body 14. The inner diameter of the retainer plate 26 is desirably smaller than that of the straight bore 16 but equal to or a little greater than the outer diameter of the center socket 20. This ensures that the stop edge 24 of the center socket 20 should come into abutment with the retainer plate 26 as the center socket 20 continues to extend forwardly, thus preventing unwanted removal of the center socket 20 out of the straight bore 16.

A typical live center 28 is carried by the center socket 20, which has a pointed front end 30 engageable with the workpiece W and a tapering rear shank 32 removably fitted into the tapering blind bore of the center socket 20. The tapering rear shank 32 conforms closely to the tapering blind bore 22 when the live center 28 has been fitted into the center socket 20. Passing through the passage hole of the slidable body is an elongate rod 34 which is fixedly secured to the center socket 20 at its proximal end and carries a dog 36 at its distal end. A rear dust seal 38 may be provided at the rear end of the head portion 15 of the slidable body 14 to inhibit any enterance of foreign matters into the straight bore 16 via the passage hole 18.

A compression spring 40 is retained within the straight bore 16 to resiliently urge the center socket 20 toward the extended position. Preferably, the compression spring 40 has a spring constant enough to yieldably depress the center socket 20 and the live center 28 against the workpiece W without causing any deformation thereto. In other words, the spring constant should be great enough to provide a stable support of the workpiece W by the live center 28, but small enough to absorb or accommodate undue forward movement of the slidable body 14, i.e., overly rotary movement of an electric motor described below.

Affixed to the slidable body 14 by means of a bracket 42 is a proximity switch 44 which may be selectively activated by the dog 36. The proximity switch 44 is designed to generate a stop signal in the event that the dog 36 reaches a rearmost position immediately above the proximity switch 44. As an alternative, a photoelectric switch or sensor may equally be used in place of the proximity switch 44 and the dog 36. Additionally, a switch box 46 can be attached to the slidable body 14 to enclose the proximity switch 44 and the dog 36 therein in an effort to protect them from environmental hazard.

To cause forward and backward movement of the slidable body 14, a drive mechanism is employed which comprises an electric motor 48 fixedly attached to the bed 12 for producing a rotary force through its output shaft 50 and a lead screw 52 connected at one end to the output shaft 50 of the electric motor 48 via, e.g., a flexible coupling 54. The electric motor 48 is connected to the proximity switch 44 through a conductor line 56 to receive the stop signal therefrom. On the other hand, the lead screw 52 is threadedly engaged with the slidable body 12 to translate the rotary force of the electric motor 48 into a linear reciprocating movement of the slidable body 12.

Figure 2:
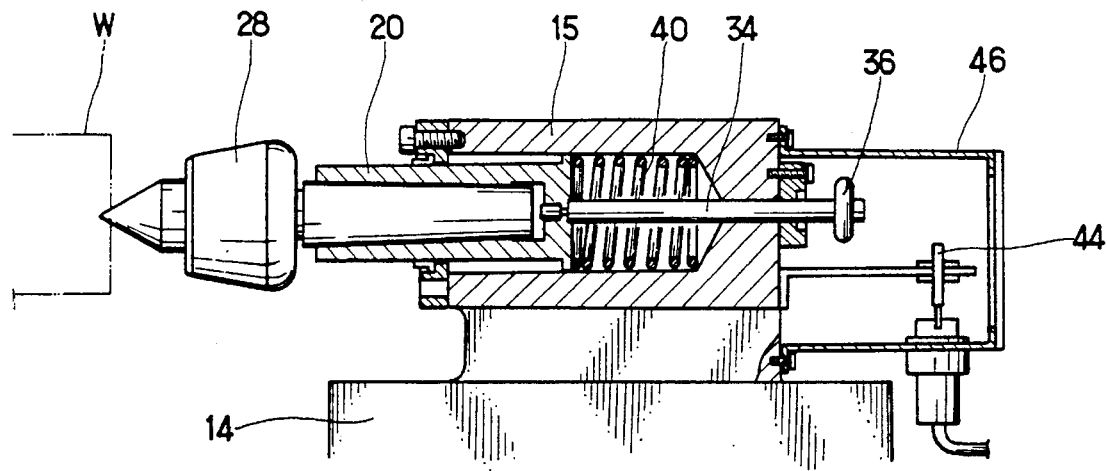
FIG. 2 is a partially enlarged view illustrating that the center socket remains in a fully extended position by the biasing force of the compression spring.

Operation of the resiliently yieldable tail stock device 10 embodying the present invention will now be described in detail with reference to FIGS. 2 and 3 as well as FIG. 1.

If the motor 48 is subjected to a counterclockwise rotation as viewed from the right hand side of FIG. 1, the lead screw 52 will be caused to rotate counterclockwise to thereby advance the slidable body 14 until the pointed front end of the live center 28 comes into contact with the workpiece W. Under the condition as depicted in FIG. 2, further forward movement of the slidable body 14 results in the live center 28 being retracted together with the center socket 20 and the elongate rod 34 against the resistant force of the compression spring 40.

Figure 3:
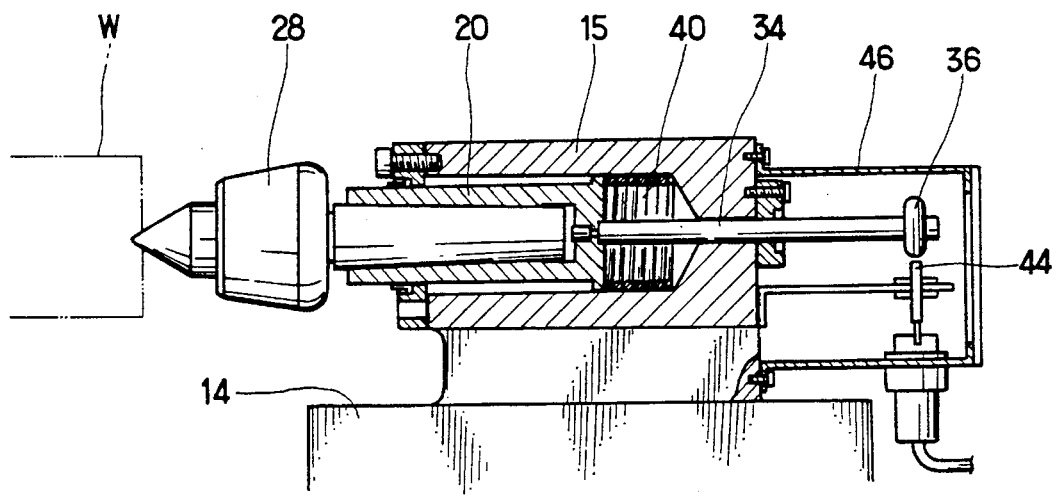
FIG. 3 is a view similar to FIG. 2 but illustrating that the center socket has been brought into a fully retracted position against the spring force.

As illustrated in FIG. 3, if the center socket 20 is brought into a fully retracted position, the dog 36 will be placed immediately above the proximity switch 44, in response to which the proximity switch 44 comes to generate a stop signal. Upon receipt of the stop signal, the electric motor is deenergized to cease its rotary movement, consequently making the slidable body 14 no longer advanceable. In this way, the workpiece W can be clamped by the tail stock device with no fear of applying an exceedingly great thrust force to the workpiece.

In order for the tail stock device to unclamp the workpiece, the electric motor 48 should be subjected to a clockwise rotation. Responsive to such a clockwise rotary movement of the motor 48, the lead screw 52 will make the slidable body 14 move backward, thus ensuring that the center socket 20 is extended back to its initial position by the biasing force of the compression spring 40. If the electric motor 48 continues to rotate clockwise, the slidable body 14 will bring the live center 28 out of contact with the workpiece W. Subsequently, the electric motor 48 is deenergized to terminate the workpiece unclamping process.

While the invention has been shown and described with reference to a preferred embodiment, it should be apparent to those skilled in the art that many changes and modifications may be made without departing from the scope of the invention as defined in the claims.

What is claimed is:

1. A resiliently yieldable tail stock device for use in a numerically controlled lathe having a bed and a spindle rotatable together with a workpiece, comprising:

a body slidable along the bed toward and away from the spindle, said slidable body having a bore and a passage hole each formed in axial alignment with the spindle;

a center socket removably received within the bore of the slidable body for movement between an extended position and an operative retracted position, said center socket having a tapering blind bore open at a front end of the center socket;

a live center having a pointed front end engageable with the workpiece and a tapering rear shank removably fitted in said tapering blind bore;

biasing means for yieldably biasing said center socket toward the extended position;

an elongate rod having a proximal end fixedly secured to said center socket and carrying a dog at a distal end thereof, said elongate rod extending through said passage hole of the slidable body;

means, actuated by the dog, for generating a stop signal as the center socket travels into the retracted position; and drive means for causing the slidable body to move back and forth and for inhibiting forward movement of the slidable body in response to the stop signal to restrict the biasing force applied to the workpiece by the biasing means.

2. The resiliently yieldable tail stock device as recited in claim 1, the biasing means includes a compression spring retained in the bore of the slidable body, the compression spring having a spring constant enough to yieldably depress the center socket and the live center toward the workpiece without causing any deformation thereto.

3. The resiliently yieldable tail stock device as recited in claim 2, wherein the drive means comprises an electric motor fixedly attached to the bed for producing a rotary force through its output shaft and a lead screw connected at one end to the output shaft of the electric motor, the lead screw threadedly engaged with the slidable body to translate the rotary force of the electric motor into a linear reciprocating movement of the slidable body.

4. The resiliently yieldable tail stock device as recited in claim 1, wherein the signal generating means is a proximity switch affixed to the slidable body by means of a bracket.

5. The resiliently yieldable tail stock device as recited in claim 4, further comprising a switch box for enclosing the proximity switch and the dog to protect them from environmental hazard.

6. The resiliently yieldable tail stock device as recited in claim 5, wherein the biasing means includes a compression spring retained in the bore of the slidable body, the compression spring having a spring constant enough to yieldably depress the center socket and the live center against the workpiece without causing any deformation thereto.

7. The resiliently yieldable tail stock device as recited in claim 6, wherein the drive means comprises an electric motor fixedly attached to the bed for producing a rotary force through its output shaft and a lead screw connected at one end to the output shaft of the electric motor, the lead screw threadedly engaged with the slidable body to translate the rotary force of the electric motor into a linear reciprocating movement of the slidable body.

8. The resiliently yieldable tail stock device as recited in claim 7, further comprising means for sealing the bore of the slidable body to inhibit any infiltration of foreign matters thereinto.

9. The resiliently yieldable tail stock device as recited in claim 8, wherein the sealing means includes a first dust seal provided at a front end of the bore of the slidable body and a second dust seal provided at a rear end of the passage hole.

10. The resiliently yieldable tail stock device as recited in claim 1, wherein the drive means comprises an electric motor fixedly attached to the bed for producing a rotary force through its output shaft and a lead screw connected at one end to the output shaft of the electric motor, the lead screw threadedly engaged with the slidable body to translate the rotary force of the electric motor into a linear reciprocating movement of the slidable body.

\* \* \* \* \*